(12) United States Patent
Takashima (10) Patent No.: US 9,869,861 B2
(45) Date of Patent: Jan. 16, 2018

(54) GLASS IMPLEMENTED DISPLAY (71) Applicant: The Arizona Board of Regents on behalf of the University of Arizona, Tucson, AZ (US)

(72) Inventor: Yuzuru Takashima, Cupertino, CA (US)

(73) Assignee: The Arizona Board of Regents on behalf of the University of Arizona, Tucson, AZ (US)

( * ) Notice: Subject to any disclaimer, the term of this patent is extended or adjusted under 35 U.S.C. 154(b) by 13 days.

(21) Appl. No.: 14/440,308

(22) PCT Filed: Nov. 8, 2013

(86) PCT No.: PCT/US2013/069205
§ 371 (c)(1),
(2) Date: May 1, 2015

(87) PCT Pub. No.: WO2014/074858
PCT Pub. Date: May 15, 2014

(65) Prior Publication Data
US 2015/0286056 A1 Oct. 8, 2015

Related U.S. Application Data (60) Provisional application No. 61/796,403, filed on Nov. 9, 2012.

(51) Int. Cl.
*G02B 27/01* (2006.01)
*G02C 11/00* (2006.01)

(52) U.S. Cl.
CPC .......... *G02B 27/0172* (2013.01); *G02C 11/10* (2013.01); *G02B 2027/0174* (2013.01); *G02B 2027/0178* (2013.01)

(58) Field of Classification Search
CPC ........ G02B 27/0172; G02B 2027/0174; G02B 2027/0178; G02C 11/10
(Continued)

(56) References Cited

U.S. PATENT DOCUMENTS 5,585,871 A 12/1996 Linden
6,023,372 A 2/2000 Spitzer et al.
(Continued)

OTHER PUBLICATIONS

International Search Report in International Application No. PCT/US2013/069205 dated Nov. 8, 2013, 2 pages.
(Continued)

*Primary Examiner* — Zachary Wilkes
*Assistant Examiner* — George G King
(74) *Attorney, Agent, or Firm* — Barry L. Davison; Davis Wright Tremaine LLP (57) ABSTRACT

An optical system and methods are disclosed. In an aspect, an optical system can comprise a display device configured to emit an image information and an image guide optically coupled to the display device, wherein the image guide is configured to receive the image information and transmit the image information along a longitudinal axis of the image guide, and wherein the image guide has a thickness along a lateral axis between about 0.3 mm and about 1 mm. The optical system can further comprise a beam combiner disposed in the image guide, the beam combiner configured to transmit at least a portion of the received image information to exit the image guide.

22 Claims, 10 Drawing Sheets (58) Field of Classification Search
USPC .......................................................... 359/633
See application file for complete search history.

(56) References Cited

U.S. PATENT DOCUMENTS

| | | |
|---|---|---|
| 6,573,952 B1 | 6/2003 | Yamazaki et al. |
| 7,631,968 B1 | 12/2009 | Dobson et al. |
| 2005/0225868 A1 | 10/2005 | Nelson et al. |
| 2007/0070859 A1* | 3/2007 | Hirayama ................ G02B 5/32 |
| | | 369/112.04 |
| 2012/0002294 A1 | 1/2012 | Dobschal et al. |

OTHER PUBLICATIONS

U.S. Appl. No. 61/796,403 entitled "Glass Implemented Display" filed Nov. 9, 2012, 12 pages.

* cited by examiner

GLASS IMPLEMENTED DISPLAY

CROSS REFERENCE TO RELATED PATENT APPLICATION

This application claims priority to U.S. patent application No. 61/796,403 filed Nov. 9, 2012, herein incorporated by reference in its entirety.

BACKGROUND

A wearable display device, such as eyewear, can be configured to superimpose image information over see-through images. The image information can represent images of communications such as emails and text alerts. Users can access such image information via a wireless network using the wearable display device. Furthermore, with an aid of location mechanisms such as a global positioning system (GPS), location specific information can also be displayed to the user. However, such image superposition capability is not fully implemented in devices for consumer applications. For example, certain wearable devices include a display panel that obscures a part of the field of view of the user. As a further example, helmet mounted devices can be bulky, complicated, and costly. Thus, such technologies cannot be adopted for low cost and light weight implementations for consumer applications. These and other shortcomings are addressed by the present disclosure.

SUMMARY

It is to be understood that both the following general description and the following detailed description are exemplary and explanatory only and are not restrictive. Methods and apparatus for transmitting image information are disclosed.

In an aspect, systems can comprise a display device configured to emit image information and an image guide optically coupled to the display device, wherein the image guide is configured to receive the image information and transmit the image information along a longitudinal axis of the image guide, and wherein the image guide has a thickness along a lateral axis between about 0.3 mm and about 1 mm. The system can further comprise a beam combiner disposed in the image guide, the beam combiner configured to transmit at least a portion of the received image information to exit the image guide.

In an aspect, methods can comprise receiving image information by an image guide, wherein the image guide has a thickness along a lateral axis between about 3 mm and about 1 mm and transmitting the image information along a longitudinal axis of the image guide via total internal reflection. The methods can further comprise transmitting the image information to exit the image guide.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and compositions.

DETAILED DESCRIPTION

Before the present methods and systems are disclosed and described, it is to be understood that the methods and systems are not limited to specific methods, specific components, or to particular compositions. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. "On the order of" can mean approximately, a fraction thereof, or a multiple thereof.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. All ranges disclosed herein are inclusive and combinable (e.g., ranges of "up to 25%, or, more specifically 5% to 20%" is inclusive of the endpoints and all intermediate values of the ranges of "5% to 25%," etc.).

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

In an aspect, the methods and systems of the present disclosure provide a compact display device comprising an image guide such as plane parallel plate (PPP) image guiding optics. As an example, the image guide can be a thin (less than about 0.5 mm) rectangular glass plate. As a further example, the image guide can be transparent. The image guide can be disposed inside a lens of eye wear, such as corrective glasses, eye protection glasses, and/or sun glasses. As such, images displayed on passive or active light emitting devices such as digital micro mirror devices (DMD) and liquid crystal displays (LCD) can be transmitted to a user (e.g., observer) by total internal reflections via the image guide. Accordingly, the users can observe see-through images passing through the image guide and obstruction of a field of view of the user is minimized. As an example, a pass through or see-through image can be from a source other than the display device. As another example, the see-through image can be transmitted from a second display or objects disposed outside eye wear. In an aspect, the plane parallel plate has no optical power, as a result the implemented plane parallel plate inside the glassware does not affect the power of the eye wear.

Figure 1:
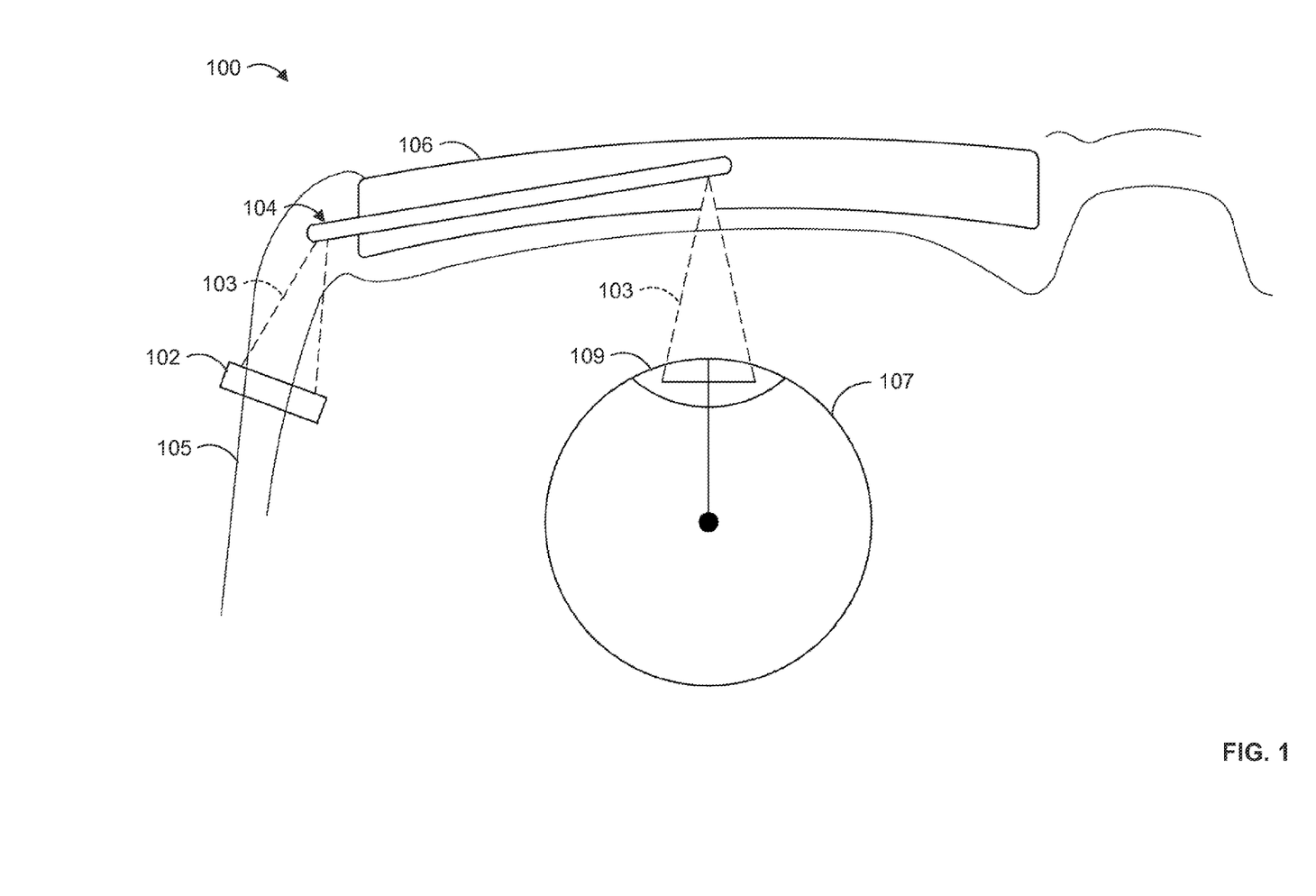
FIG. 1 illustrates a schematic diagram of an exemplary optical system.
Figure 2:
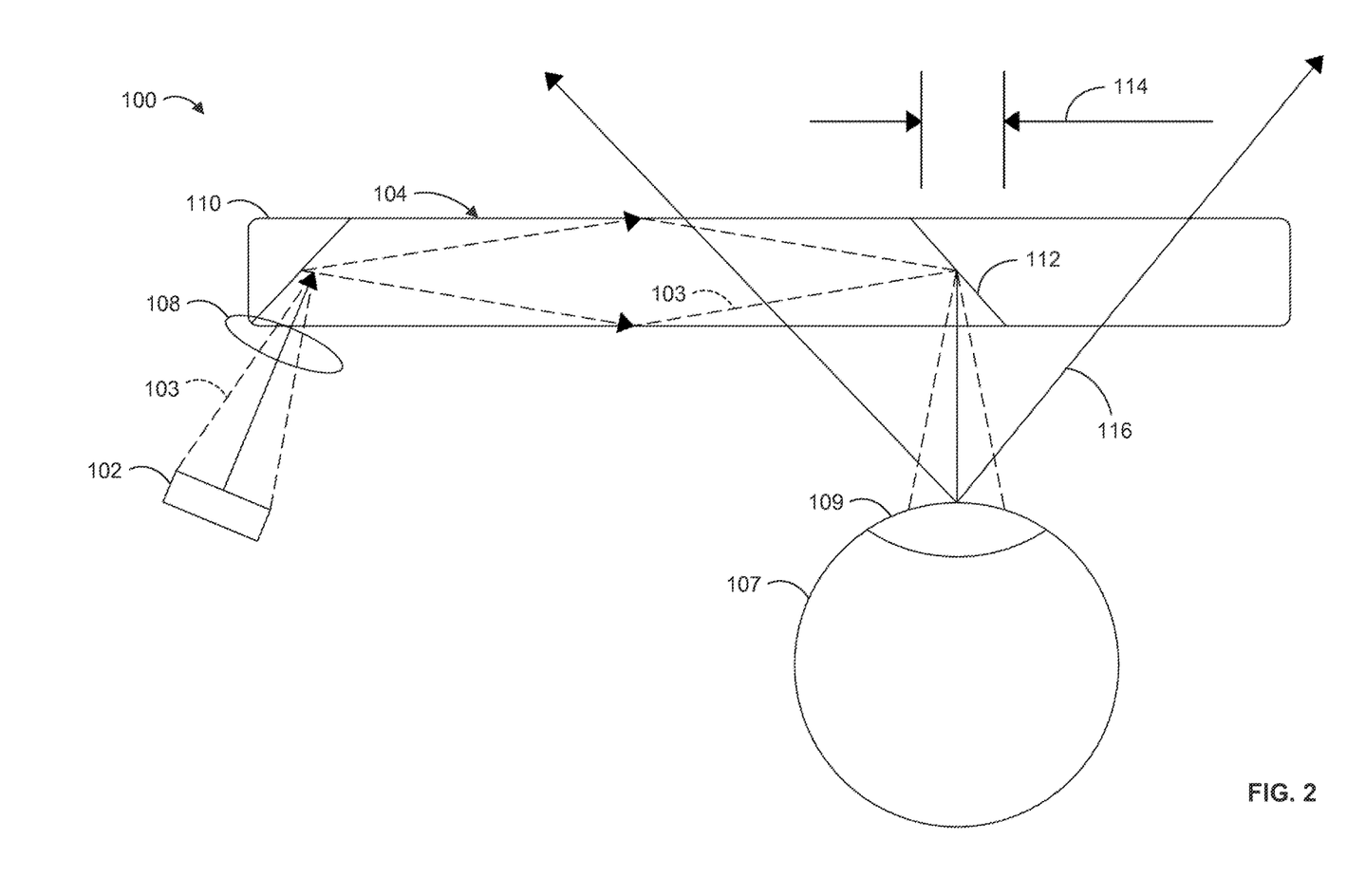
FIG. 2 illustrates a schematic diagram representing a top view of an exemplary optical system.
Figure 3:
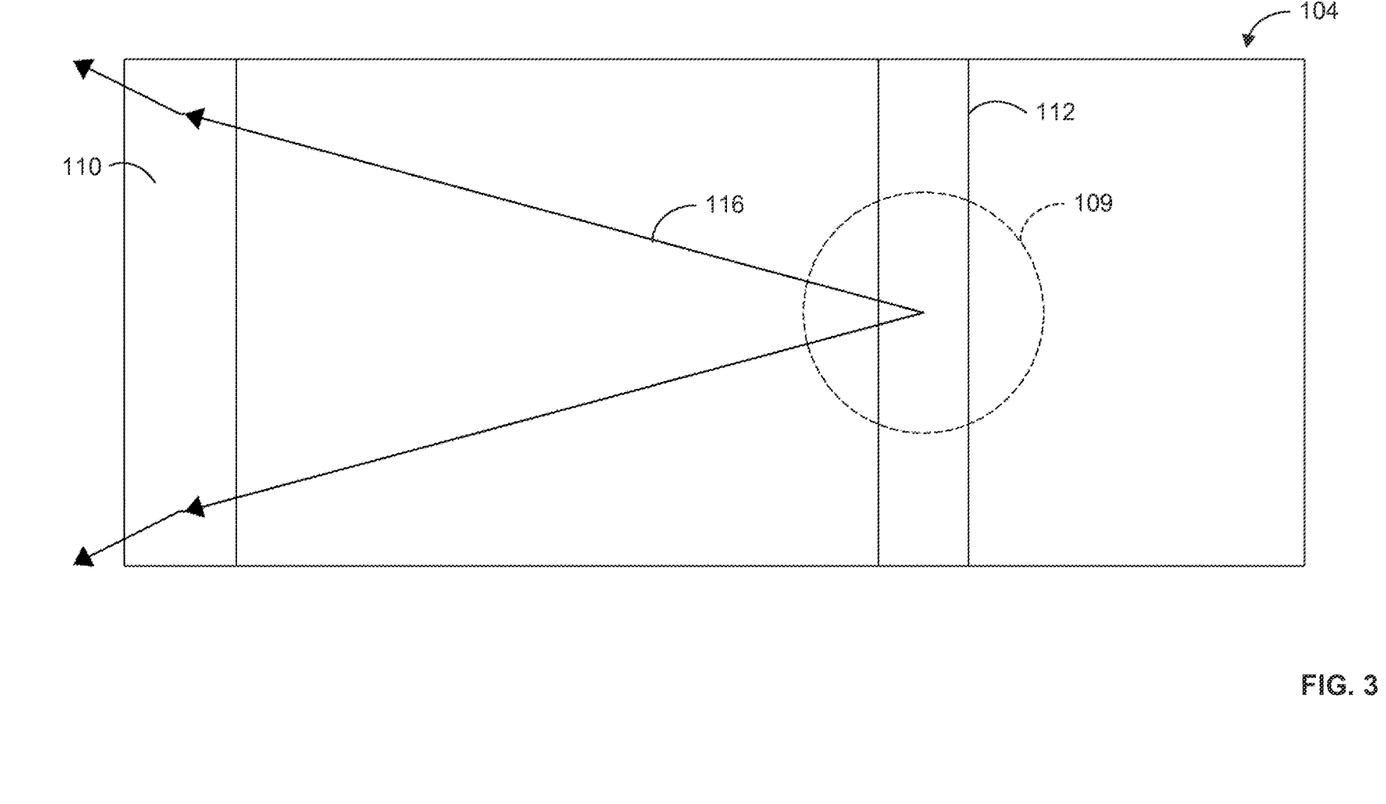
FIG. 3 illustrates a schematic diagram representing a side view of an exemplary optical system.

In an aspect, FIGS. 1-3 show schematic diagrams of an exemplary optical system 100. The optical system 100 can comprise a display device 102 and an image guide 104. As shown, the display device 102 and the image guide 104 can be disposed in at least a portion of a wearable device 105, such as eyewear having one or more lenses 106 such as corrective lenses, for example. In an aspect, material used for the image guide 104 can have a higher index of refraction compared to the index of refraction for the corrective lenses 106. As an example, Sapphire glass, and optical glasses such as LAK, LAF, BASF SF and LASF series from Schott glass, and equivalents are usable for the image guide 104. The image guide 104 can be implemented into conventional eye wear such as prescription glasses, sun-glasses as well as helmets, protection goggles, ski goggles, clip-on glasses, and the like.

In an aspect, the display device 102 can be or comprise a flat display device (FDD), digital micro mirror device (DMD), and/or a liquid crystal display (LCD). Other devices for presenting images can be used such as a flat or curved organic light emitting diode (OLED) arrays, spatial phase light modulators, spatial polarization modulators, and grating based light modulators. In operation, the display device 102 can present image information such as emitted light rays 103 representing one or more images. In an aspect, image information provided by the display device 102 can be transmitted via the image guide 104 to present a virtual image. As an example, the virtual image can be formed at an accommodation distance or further (e.g., about 250 mm or further) measured from the eye 107 (e.g., pupil 109) of the user.

In a further aspect, one or more optical elements 108 (FIG. 2) can be disposed between the display device 102 and the image guide 104 to direct the image information into the image guide 104. As an example, the display device 102 can be located close to the front focal point of the one or more optical elements 108 so that light rays from a point at the display device 102 are collimated or quasi-collimated inside the image guide 104 by optical element 108.

In an aspect, one or more of the optical elements 108 can be a positive lens used in a magnifying configuration so that a virtual and magnified image is formed toward a reflective portion 110 of the image guide 104. As another example, the reflective portion 110 can comprise a half mirror. Alternatively, one or more of the optical elements 108 can be situated at a polished edge of the image guide 104. As a further example, one or more separate optical elements can be used to provide the function of the reflective portion 110 of the image guide 104. In another aspect, the image information of the display device 102 can be transmitted to the eye 107 of the user by total internal reflection(s).

In an aspect, the image information can be coupled to the eye 107 of the user via a beam combiner 112 (FIGS. 2-3). As an example, the beam combiner 112 can be disposed in the image guide 104. As another example, the beam combiner 112 can be at least partially encompassed by the image guide 104. As another example, the beam combiner 112 can be or comprise a half mirror. As a further example, a coated mirror, dichroic mirror, planer hologram, curved hologram, volume hologram, and/or segmented mirror, are usable as the beam combiner 112.

In an aspect, the beam combiner 112 can have a horizontal projected width 114 that is smaller than a diameter of an eye pupil 109 of a user of the optical system 100. Eye pupils can vary in diameter (e.g., from about 3 mm to about 9 mm), for example, based on an age of the user, an environment of the user, or other factors. As such, favorable results have been achieved when the beam combiner 112 has a horizontal projected width 114 of less than the diameter of the eye pupil. For example, favorable results have been achieved when the beam combiner 112 has a horizontal projected width 114 of about 3 mm, about 2.9 mm, about 2.8 mm, about 2.7 mm, about 2.6 mm, about 2.5 mm, about 2.4 mm, or about 2.3 mm. In an aspect, a horizontal projected width of 0.1 mm to about 3 mm can minimize degradation of the transmitted image information 103 due to any diffraction effect. Other projected widths can be used and can depend on the pupil diameter of the user. In an aspect, the extent of the beam combiner 112 in a vertical direction can be on the order of tens of millimeters. Due to the small extent of the beam combiner in the horizontal direction, obstruction of a field of view 116 of the user by the beam combiner 112 is minimized. As an example, since the eye of the user accommodates see-through objects, but not the beam combiner 112, the image of the beam combiner 112 on the user's retina is substantially defocused.

In an aspect, the image guide 104 can be a transparent plane parallel plate, consequently, cross talk between see-through images (e.g., passing through the plane of the image guide 104) and the transmitted image information from the display device 102 is minimized. In another aspect, when the image guide 104 is disposed in a corrective lens (e.g., lens 106 (FIG. 1)), the correcting power of the lens is not altered by the image guide 104, since the image guide 104 has no additional optical power. As an example, see-through images passing through the corrective lenses can be altered by the corrective lens, but will not interfere with image information transmitted via the image guide 104.

Figure 4:
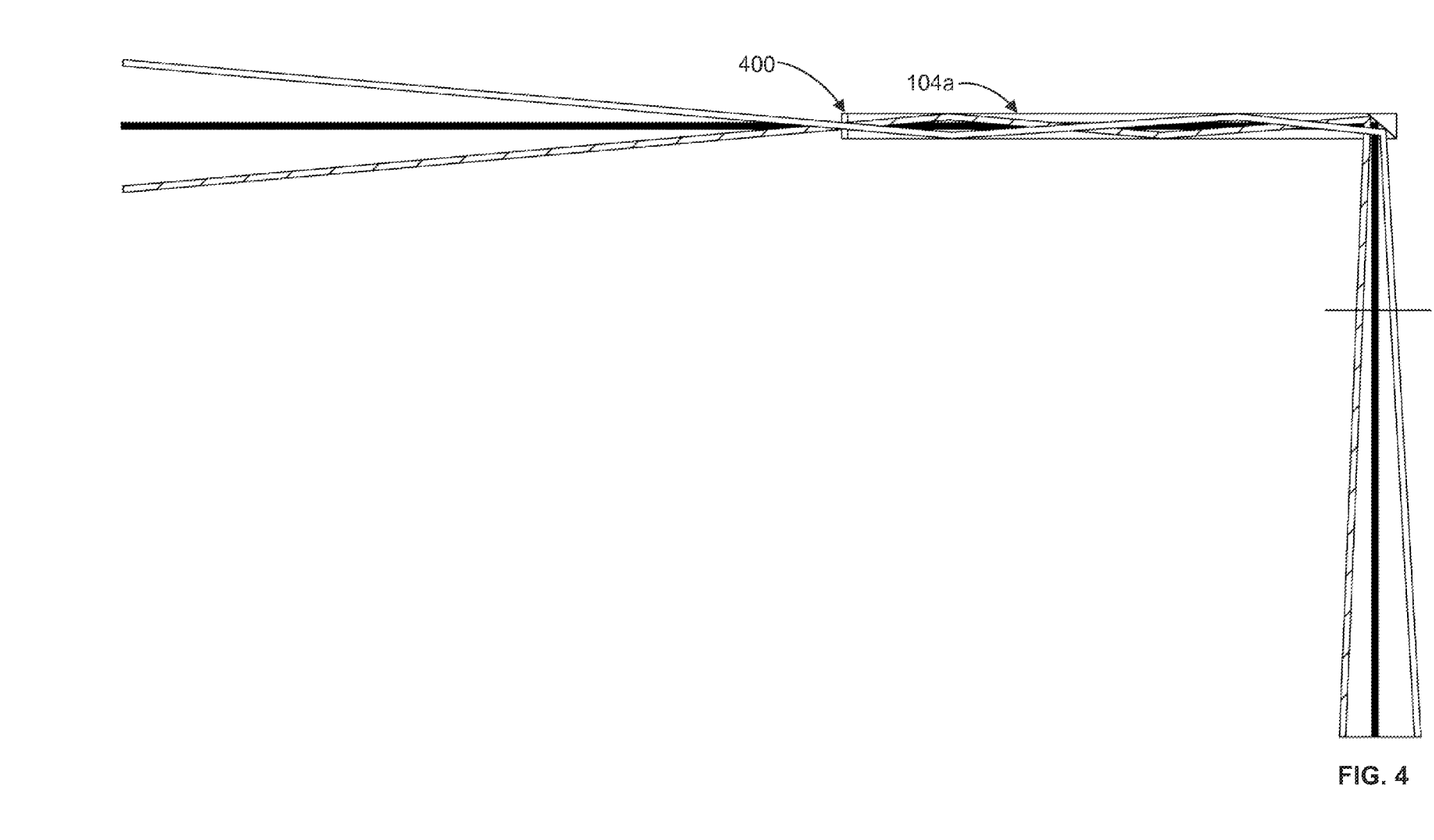
FIG. 4 illustrates a schematic diagram representing a side view of an exemplary optical system including example light rays.
Figure 5:
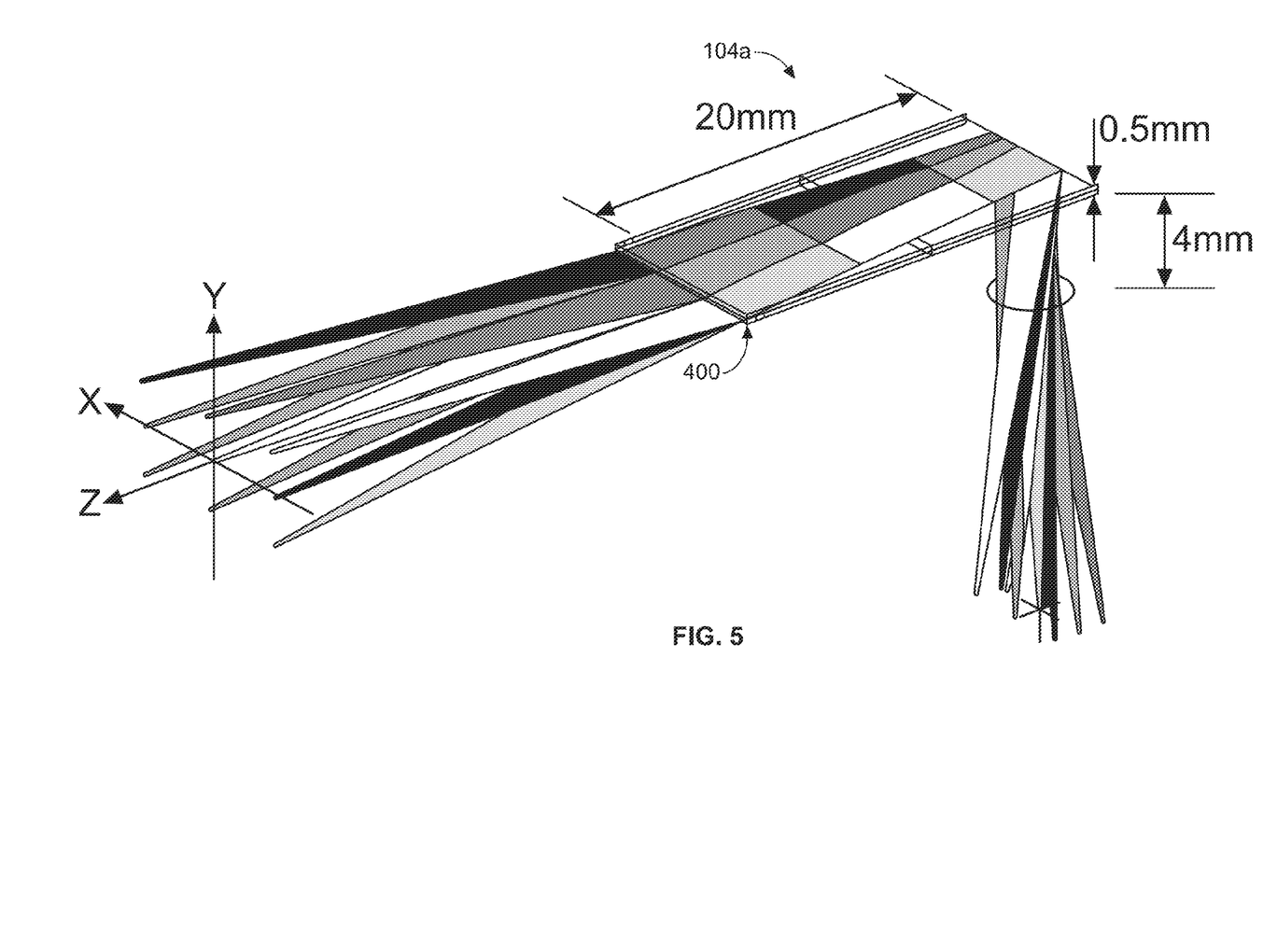
FIG. 5 illustrates a schematic diagram representing a perspective view of an exemplary optical system including example light rays.

FIG. 4 shows a side view of the image guide 104a with a lens 400 to form a virtual image at infinity. FIG. 5 shows a perspective view of the system depicted in FIG. 4. As depicted in FIGS. 4-5, light rays are directed along a longitudinal axis (Z-axis) of the image guide 104a. As shown in the example of FIGS. 4-5, no total internal reflections (TIR) (or substantially none) are involved for the vertical field of view (along the lateral X-axis of FIG. 5), whereas TIR occurs during the image transfer (transmission of image information) for the horizontal field of view (along the vertical Y-axis of FIG. 5).

Figure 6:
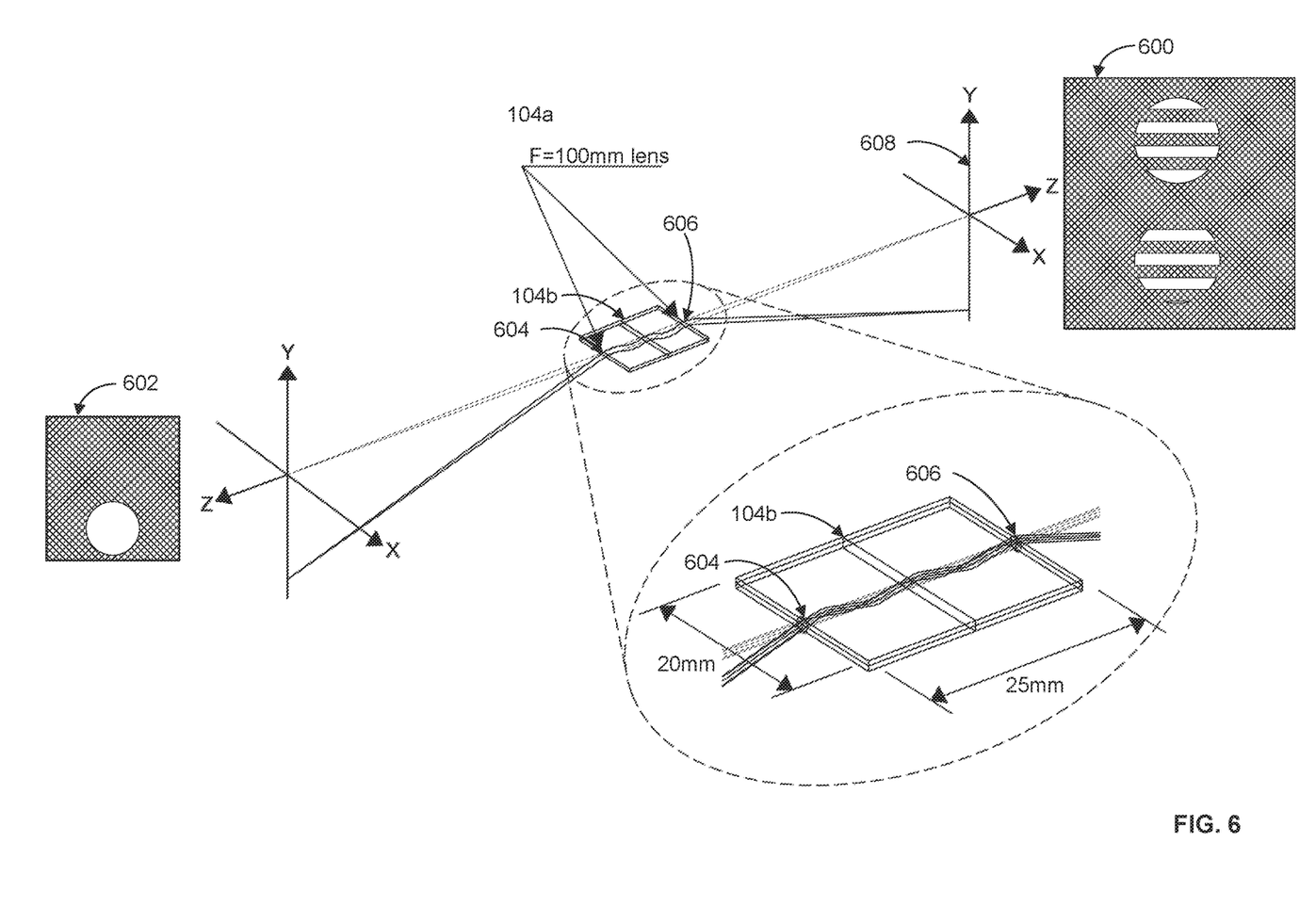
FIG. 6 illustrates a schematic diagram representing a perspective view of an exemplary optical system including example light rays.

FIG. 6 illustrates an optical system that has been modified from the configuration in FIGS. 4-5. In FIG. 6, an image 600 of the object 602 (or FDD) is formed at infinity by a first lens 604 (e.g., having a focal length (f) of about 100 mm). In an aspect, image information is transferred through image guide 104b. As an example, the image guide 104b is shown having dimensions of 20×25×1 mm. The intermediate image at infinity is then focused by a second lens 606 (having f=100 mm) on the image plane 608. The second lens 606 and final image 600 operates as an eye and retinal image, respectively.

Figure 7:
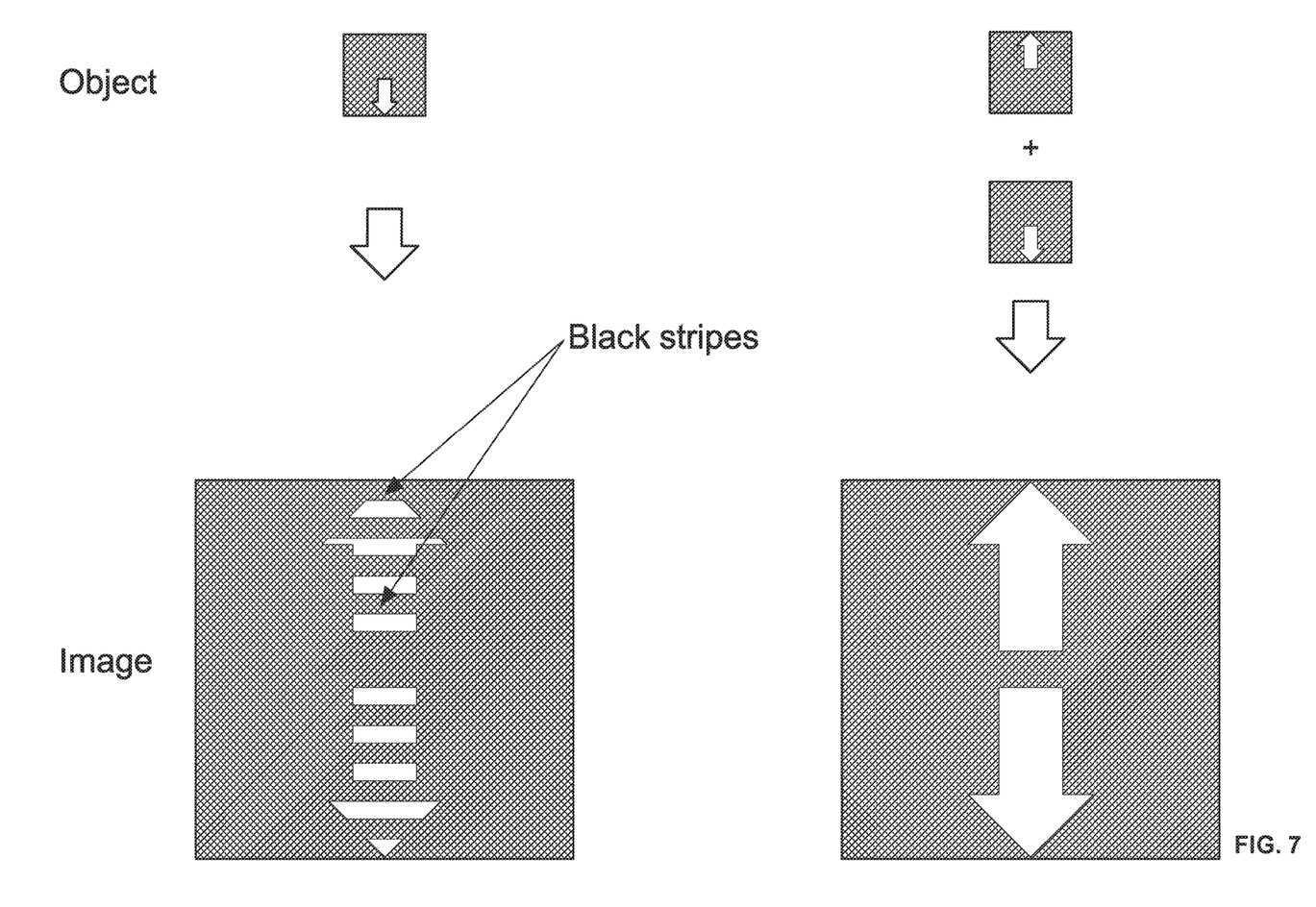
FIG. 7 illustrates pre-distortion of an input image and a final image through the optical system.

As illustrated in FIG. 7, due to the multiple reflections in the image guide and truncation of the beam at the output of the image guide, a single object image forms two symmetrical output images with respect to the vertical Y-axis. In addition, each of the symmetrical output images complementally has dark regions. To address the dark regions, input image information can be pre-distorted such that an image represented by the input image information has symmetry with respect to at least one axis. As an example, FIG. 7 illustrates such pre-distortion of the input image information and a resultant final image through the optical system 100 (FIG. 2). As shown in FIG. 7, the input image information can be pre-distorted to result in mirrored images about at least one axis. When the pre-distorted input image information is transmitted through the optical system 100 (FIG. 2), the dark regions of the output image are minimized and/or eliminated. In an aspect, one of the resultant output images can be eliminated by adjusting a tilt angle of the beam combiner 112. In another aspect, the tilt angle of the beam combiner 112 can be preconfigured to eliminate one of the resultant output images (or any portion of image information exiting the image guide) from a field of view of the user. In a further aspect, a placement (e.g., tilt, distance from pupil, etc.) of the image guide 104 can be configured to minimize or eliminate unwanted image information (e.g., one of the resultant output images or any unwanted portions of image information exiting the image guide) from a field of view of the user.

Figure 8:
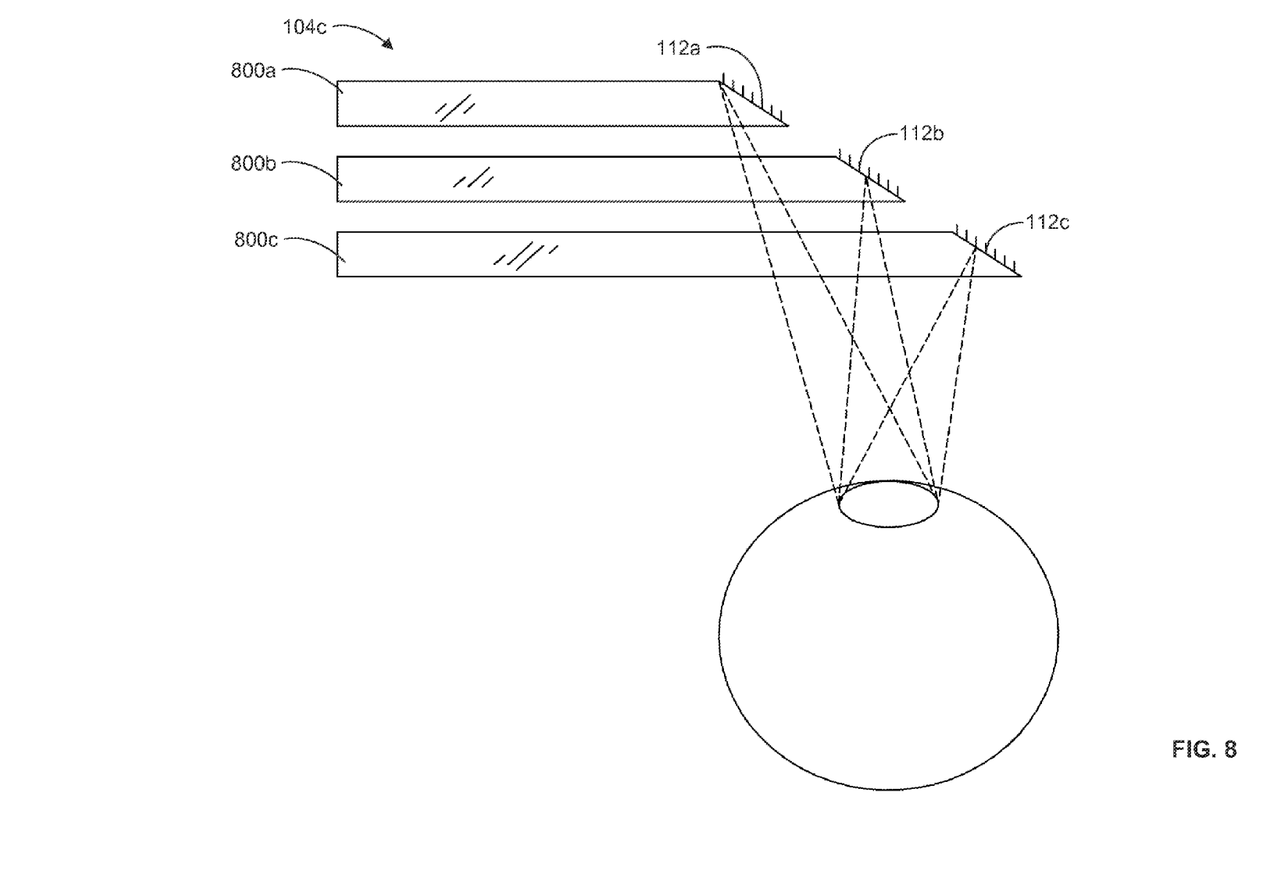
FIG. 8 illustrates a schematic diagram representing a top view of an exemplary optical system.

As shown in FIG. 8, an image guide 104c can comprise two or more optical layers 800a, 800b, 800c. In an aspect, each of the layers 800a, 800b, 800c can be configured to provided total internal reflection along a longitudinal axis of the respective layer 800a, 800b, 800c. In another aspect, each of the layers 800a, 800b, 800c can operate as a separate image guide to extend a FOV. As an example, each of the layers 800a, 800b, 800c can comprise a beam combiner 112a, 112b, 112c to direct image information to exit the respective layer 800a, 800b, 800c (e.g., toward an eye of a user).

Figure 9:
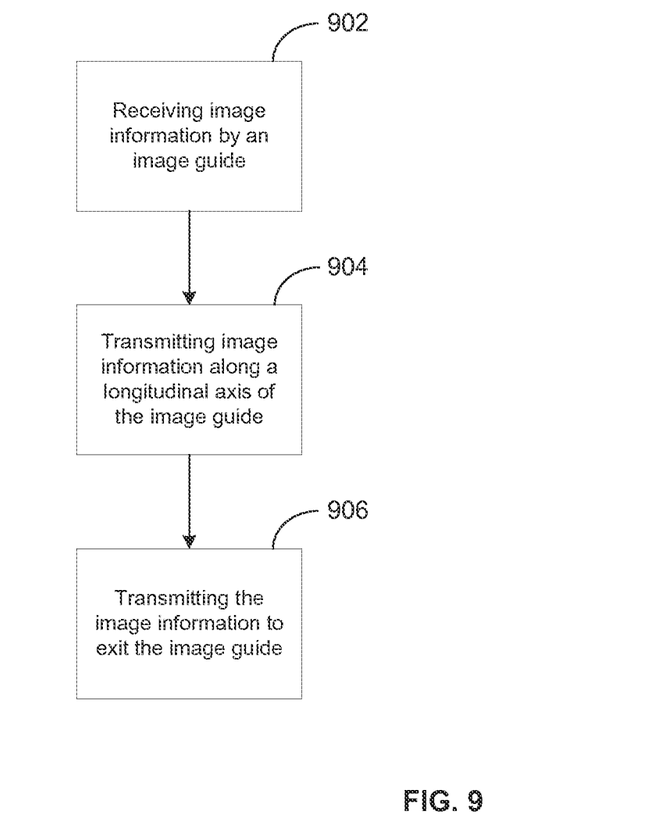
FIG. 9 illustrates a flow diagram of an exemplary method.

FIG. 9 illustrates an exemplary method. In step 902, image information can be received by an image guide. In an aspect, image information can comprise emitted light rays representing one or more images. In another aspect, the received image information is distorted to have image symmetry about an axis. In yet another aspect, the image guide has a thickness along a lateral axis between about 0.3 mm and about 1 mm. As an example, the image guide can be or comprise a transparent plane plate.

In step 904, the image information can be transmitted along a longitudinal axis of the image guide via total internal reflection. In step 906, the image information can be transmitted to exit the image guide. In an aspect, the image information can exit the image guide and can be coupled to an eye of a user via a beam combiner. As an example, the beam combiner can be disposed in the image guide. As another example, the beam combiner can be at least partially encompassed by the image guide. As another example, the beam combiner can be or comprise a half mirror. As a further example, a coated mirror, dichroic mirror, planer hologram, curved hologram, volume hologram, and/or segmented mirror, are usable as the beam combiner 112.

The systems and methods described herein provide a full field of view, wherein outside (pass through) images are preserved. An image system can be integrated with wearable devices such as correction glasses. As such, the user observes both displayed and see-through images without being disturbed by the display device located within the FOV. As an example, see-through images can comprise image information transmitted from a source outside the image system through a plane of an image guide. As another example, the source of see-through images can be an object or a second display device.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for.

Figure 10:
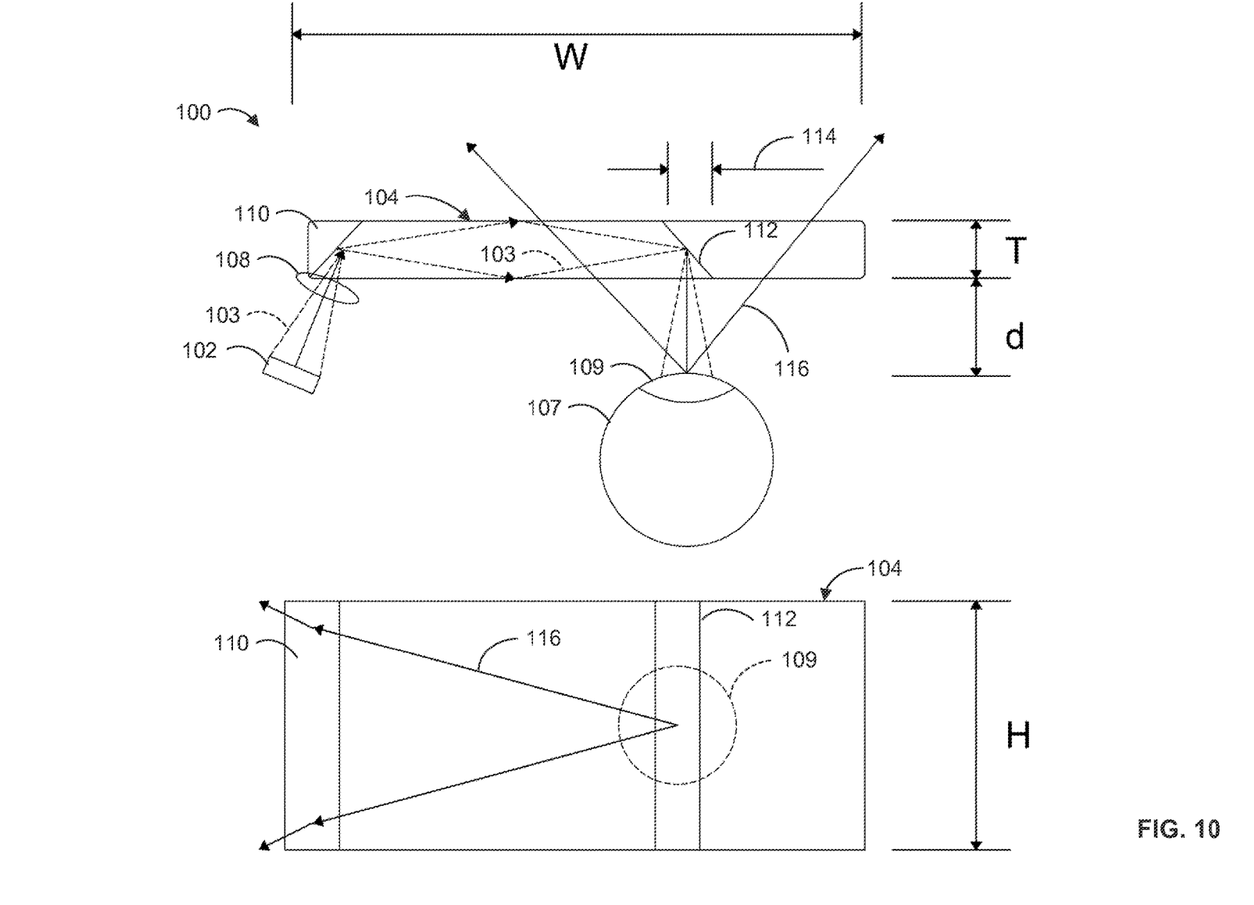
FIG. 10 illustrates schematic diagrams of an exemplary optical system.

FIG. 10 illustrates an optical system comprising an image guide 104d. In an aspect, the image guide 104d is shown having the following dimensions:

Thickness (T)=about 1 mm;
Height (H)=about 10 mm;
Width (W)=about 20 mm; and
distance (d)=about 10 mm, wherein d is measured between an exit plane of the image guide 104d and an eye pupil.

In certain circumstances, the values for T, W, H, and d can have certain ranges, such as:

T is between about 0.3 mm and about 1.0 mm;
W is between about 1 mm and about 40 mm;
H is between about 1 mm and about 40 mm; and
d is less than about 11 mm.

Other dimensions can be used to maintain a favorable FOV of a user. As an example, d can be greater than 11 mm, while a favorable FOV is maintained by implementing a multilayer image guide such as illustrated in FIG. 8.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for use in eyewear, said eyewear including a lens that passes see through images, said system comprising:
   a display device that emits image information of an object;
   an image guide optically coupled to the display device, wherein the image guide is configured to receives the image information, transmit the image information along a longitudinal axis of the image guide via multiple reflections, form, with respect to a direction normal to the longitudinal axis, two symmetrical output images of the object in the image information from the display device, and superimpose at least one of the output images over the see through images for viewing; and
   a beam combiner disposed in the image guide, the beam combiner configured to receive the image information transmitted through the image guide and transmit only a portion of the received image information from the image guide, so that only one of the two symmetrical output images of the object in the image information is transmitted and superimposed over the see through images for viewing by a user and the remaining one of the two symmetrical output images of the object in the image information is eliminated from a field of view of the user;
   wherein the beam combiner comprises a hologram, or a mirror having a tilt angle to the longitudinal axis of the image guide, said mirror or hologram configured such that one of the two symmetrical output images of the single object in the image information is transmitted outside the field of view of the user.

2. The system of claim 1, wherein the display device is one of a micro mirror device a liquid crystal device, an array of light emitting diode, a spatial phase light modulator, a spatial polarization modulator, and a grating based light modulator.

3. The system of claim 1, wherein the image guide is a transparent plane parallel plate.

4. The system of claim 1, wherein the image guide is further configured to transmit the image information via total internal reflection.

5. The system of claim 1, wherein a length of the image guide along the longitudinal axis is between about 1 mm and about 40 mm.

6. The system of claim 1, wherein a dimension of the image guide along a direction normal to the longitudinal axis is between about 1 mm and about 40 mm.

7. The system of claim 1, wherein the image guide comprises two or more adjacent layers.

8. The system of claim 1, further comprising an optical element encompassing at least a portion of the image guide, wherein the optical element has an optical power that is non-zero.

9. The system of claim 8, wherein the optical element is a lens of corrective eyewear.

10. The system of claim 1, wherein the image guide is configured to be disposed less than about 11 mm from a pupil of an eyeball of a user.

11. The system of claim 1, wherein the image guide is configured to minimize optical crosstalk between the image guide and the see through image by limiting an extent of the beam combiner along the longitudinal axis to a value of about 3 mm to about 2.3 mm.

12. The system of claim 11, wherein the extent of the beam combiner along the longitudinal axis is less than a diameter of a pupil of a user of the system.

13. The system of claim 1, wherein the beam combiner comprises a mirror, half mirror or a holographic beam combiner.

14. The system of claim 1, said image guide comprising a surface that reflects and superimposes the image information over the see through images for viewing.

15. The system of claim 1, wherein the image guide has a thickness along a lateral axis between about 0.3 mm and about 1 mm.

16. The system of claim 15, wherein the extent of the beam combiner along the longitudinal axis is less than a diameter of a pupil of a user of the method.

17. The system of claim 1, wherein the display device is further configured to pre-distort the image information, prior to receiving and transmitting the image information by the image guide, to minimize or eliminate complemental dark regions in the two symmetrical output images of the object in the image information.

18. A method for superimposing image information from a display device over another image for viewing, comprising:

receiving image information of an object, from a display device, by an image guide;

transmitting the image information along a longitudinal axis of the image guide via total internal reflection;

forming, with respect to a direction normal to the longitudinal axis, two symmetrical output images of the object in the image information from the display device;

superimposing at least one of the output images over another image not from the display device for viewing; and receiving, using a beam combiner disposed in the image guide, the image information transmitted through the image guide and transmitting only a portion of the image information received from the image guide, so that only one of the two symmetrical output images of the object in the image information is transmitted and superimposed over the another image not from the display device for viewing by a user and the remaining one of the two symmetrical output images of the object in the image information is eliminated from a field of view of the user;

wherein the beam combiner comprises a hologram, or a mirror having a tilt angle to the longitudinal axis of the image guide, said mirror or hologram configured such that one of the two symmetrical output images of the single object in the image information is transmitted outside the field of view of the user.

19. The method of claim 18, wherein two symmetrical images of a single object in the received image information are formed with respect to a direction normal to the longitudinal axis, said method further comprising adjusting a tilt angle of the beam combiner so that one of the two symmetrical images of the single object in the image information is outside the field of view of the user.

20. The method of claim 18, wherein the image guide has a thickness along a lateral axis between about 0.3 mm and about 1 mm.

21. The method of claim 18, further comprising predistorting the image information, prior to receiving and transmitting the image information by the image guide, to minimize or eliminate complemental dark regions in the two symmetrical output images of the object in the image information.

22. The method of claim 18, wherein the extent of the beam combiner along the longitudinal axis is less than a diameter of a pupil of a user of the method.

* * * * *